United States Patent
Chen et al.

(10) Patent No.: US 7,006,351 B2
(45) Date of Patent: Feb. 28, 2006

(54) MOUNTING APPARATUS FOR DATA STORAGE DEVICE

(75) Inventors: Yun Lung Chen, Tu-chen (TW); YanXi Yang, Shenzhen (CN); Zhou Xu, Shenzhen (CN)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/948,804

(22) Filed: Sep. 22, 2004

(65) Prior Publication Data

US 2005/0063152 A1   Mar. 24, 2005

(30) Foreign Application Priority Data

Sep. 24, 2003   (TW) .............................. 92217127 U

(51) Int. Cl.
   *G06F 1/16*   (2006.01)
(52) U.S. Cl. .................. 361/685; 361/725; 312/223.1; 312/233; 248/222.11
(58) Field of Classification Search ................. 361/685
   See application file for complete search history.

(56) References Cited

U.S. PATENT DOCUMENTS

| | | | |
|---|---|---|---|
| 5,447,367 A | 9/1995 | Wei | |
| 5,599,080 A | 2/1997 | Ho | |
| 5,801,920 A | 9/1998 | Lee | |
| 5,806,949 A | 9/1998 | Johnson | |
| 6,008,984 A * | 12/1999 | Cunningham et al. | ...... 361/685 |
| 6,059,156 A * | 5/2000 | Lehtinen | ..................... 224/197 |
| 6,421,236 B1 * | 7/2002 | Montoya et al. | ............ 361/685 |
| 6,601,933 B1 * | 8/2003 | Greenwald | .................. 312/333 |

FOREIGN PATENT DOCUMENTS

TW   224797   6/1994

* cited by examiner

*Primary Examiner*—Lynn Feild
*Assistant Examiner*—Anthony Q. Edwards
(74) *Attorney, Agent, or Firm*—Wei Te Chung

(57) ABSTRACT

A mounting apparatus for a data storage device (10) with a plurality of protrusions (14) formed thereon. The mounting apparatus comprises a bracket (30), a pair of retaining members (50), and a pair of latches (70). A pair of openings (40) is defined in each side plate (34) of the bracket. The retaining members are attached to inner sides of the side plates and each comprises a pair of retaining portions (58). The retaining portions each comprise a resilient arm (60) and a positioning portion (58). The protrusions are limited in a space defined by the resilient arm and the positioning portion. A hook (610) is formed on the resilient arm and extends through corresponding opening. The latches are pivotally attached to outsides of the bracket and ends are received in corresponding hooks. The data storage device is released from the bracket by pressing the latches.

20 Claims, 4 Drawing Sheets

MOUNTING APPARATUS FOR DATA STORAGE DEVICE

BACKGROUND OF THE INVENTION

1. Field of the Invention

The present invention relates to a mounting apparatus, and more particularly to a mounting apparatus for readily attaching a data storage device in a computer enclosure.

2. Description of the Related Art

A typical personal computer comprises data storage devices such as a hard disk drive (HDD), a floppy disk drive and a compact disc-read only memory (CD-ROM) drive.

Conventionally, the data storage devices are attached to a chassis of a computer enclosure using screws. U.S. Pat. No. 5,447,367 discloses a drive bracket which is attached to a computer enclosure with screws. A tool such as a screwdriver is required to fasten the screws, and to unfasten the screws when removing the data storage devices. This is inconvenient and time-consuming, and particularly costly in mass production facilities. Furthermore, during assembly, extra operation space for manipulating the screws is needed. This militated against the modem trend toward reducing the size of a computer. Moreover, screws can be accidentally lost during assembly.

Various solutions have been devised to overcome the problems inherent in screw-type drive attachment means. One popular solution is to attach slide rails to opposite sides of the data storage device, and incorporate complementary guiding rails in the computer chassis. Said rails allow the computer driver to be slide into the chassis and then locked in place. Typical examples of this solution are disclosed in U.S. Pat. Nos. 5,806,949, 5,801,920 and 5,599,080, and in Taiwan Patent Applications Nos. 79209891 and 82207667. However, none of these solutions eliminates the need for screws, because screws are still required to attach the slide rails to the data storage device.

Thus, an improved mounting apparatus for data storage devices which overcomes the above-mentioned problems is desired.

BRIEF SUMMARY OF THE INVENTION

Accordingly, an object of the present invention is to provide a mounting apparatus for easy and convenient installation or removal of data storage devices into or from a computer enclosure without screws.

To achieve the above-mentioned objects, a mounting apparatus for a data storage device, the data storage device forms a plurality of protrusions on both sidewalls, the mounting apparatus comprises a bracket, a pair of retaining members, and a pair of latches. The bracket comprises a bottom plate and a pair of opposite side plates extending therefrom. A pair of openings is defined in each of the side plates. The retaining members are attached to inner surfaces of the side plates of the bracket and each comprises a pair of retaining portions. The retaining portions are received in corresponding openings and each comprises a resilient arm and a positioning portion located beneath. An arc-shaped lower concavity is formed at a top of the positioning portion and an arc-shaped upper concavity is formed at a bottom of the resilient arm. The protrusion is secured in a space defined by the upper concavity and the lower concavity. A hook is formed on a bottom of the resilient arm and extending through corresponding openings. The resilient arm can move forwardly and rearwards by the driven of the hook. The latches are pivotally attached to outsides of the side plates of the bracket. Each of the latches comprises a pressing portion and two operating ends extending horizontally from two distal ends of the pressing portion. The operating ends are received in corresponding hooks. The data storage device is released from the bracket by pressing the pressing portions of the latches.

Other objects, advantages and novel features of the present invention will be drawn from the following detailed description of a preferred embodiment of the present invention with the attached drawings, in which:

DETAILED DESCRIPTION OF THE INVENTION

Figure 1:
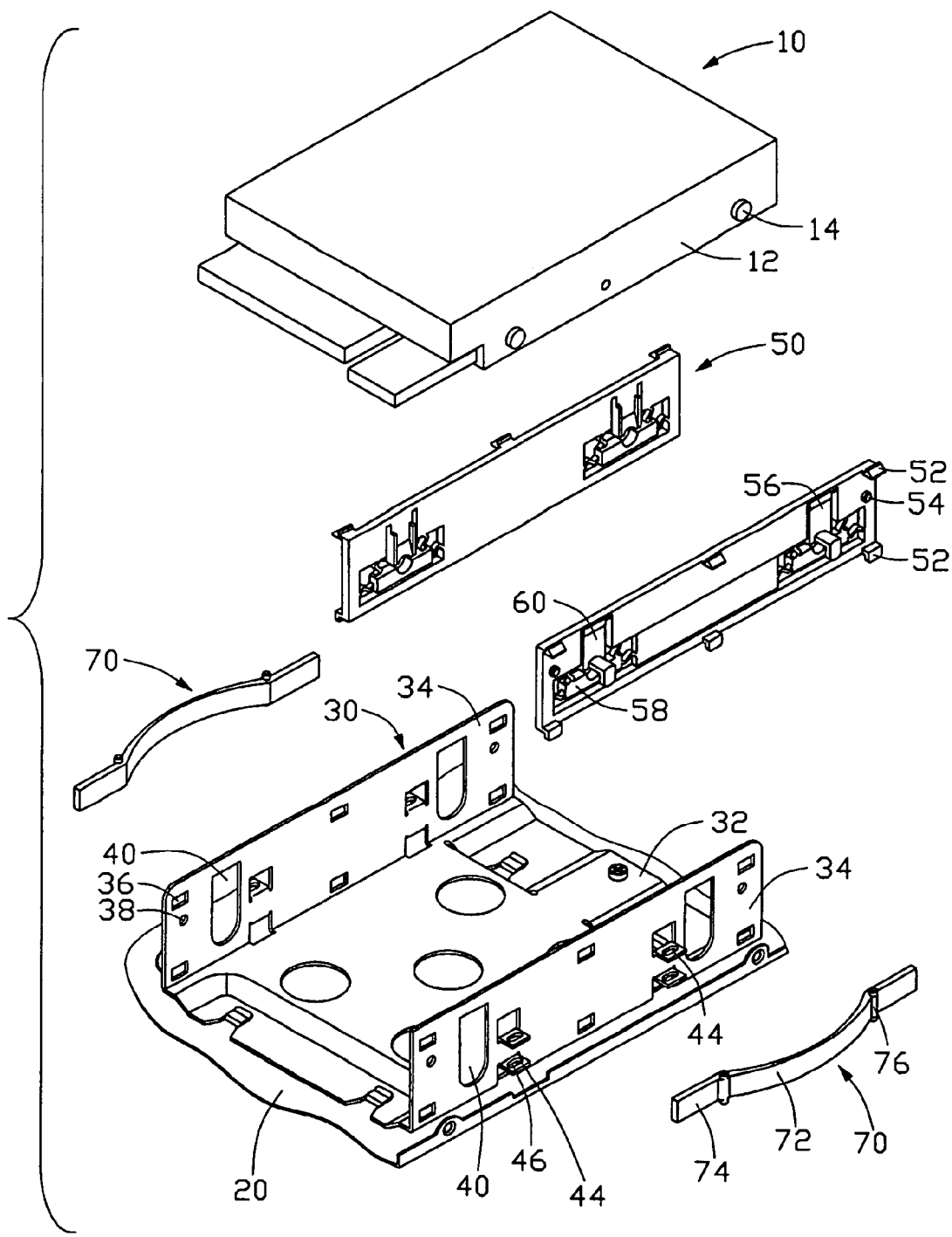
FIG. 1 is an exploded, isometric view of a mounting apparatus in accordance with the present invention, together with a data storage device.
Figure 2:
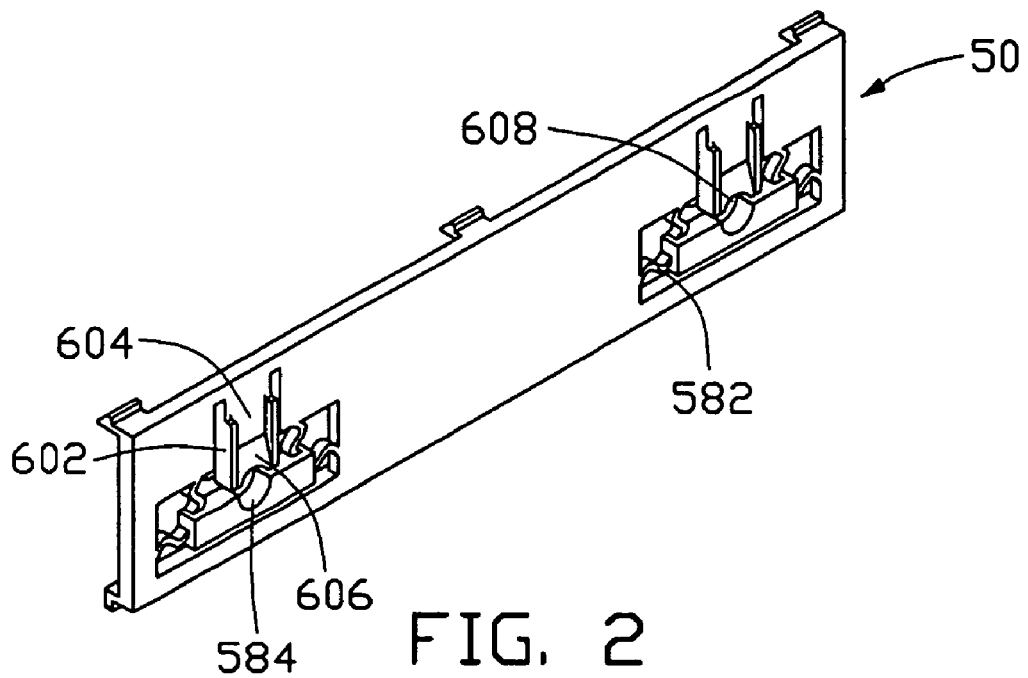
FIG. 2 is a perspective view of an retaining member of the amounting apparatus of FIG. 1.
Figure 3:
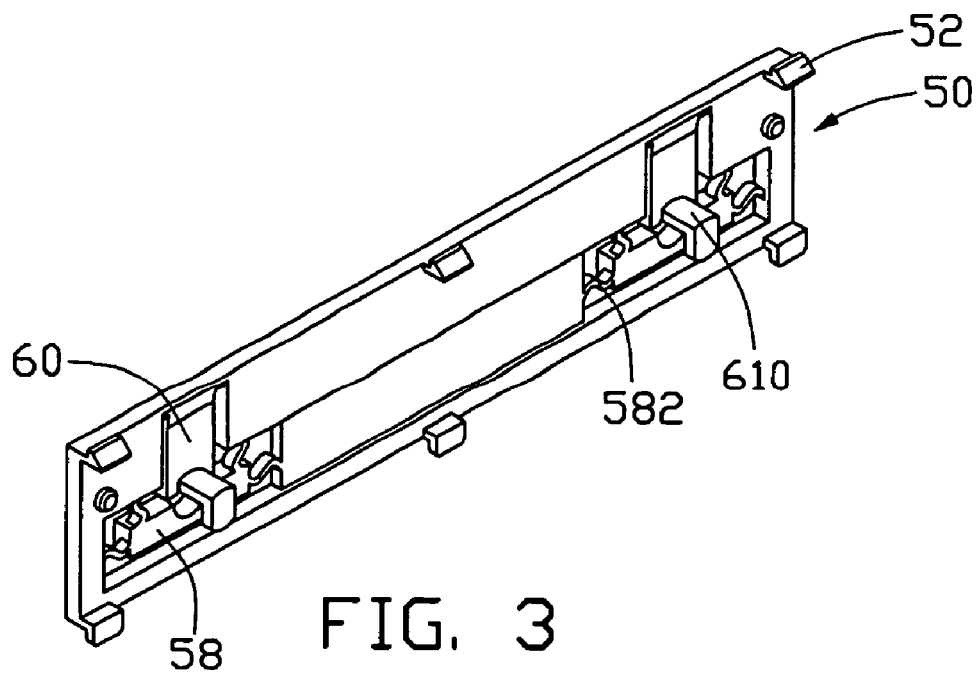
FIG. 3 is similar to FIG. 2, but viewed from another aspect.

Referring to FIGS. 1 to 3, a mounting apparatus in accordance with the preferred embodiment of the present invention is used for securing a data storage device 10 to a bottom panel 20 of a computer chassis (not shown). The mounting apparatus comprises a bracket 30, a pair of retaining members 50, and a pair of latches 70.

A pair of aligned protrusions 14 is formed on each of opposite sidewalls 12 of the data storage device 10. Alternatively, other suitable members may be provided at the opposite sidewalls 12 of the data storage device 10 such as screws, the members performing the same function as the protrusions 14 as described below.

The bracket 30 is generally U-shaped, and is attached to the bottom panel 20 by conventional means. The drive bracket 30 comprises a bottom plate 32, and a pair of side plates 34 extending upward from opposite longitudinal edges of the bottom plate 32. Three pairs of rectangular hook holes 36 are defined in a middle portion and two end portions of each side plate 34 respectively. An aperture 38 is defined in each end portion of the side plates 34 between the hook holes 36. A pair of openings 40 is defined in each side plate 34 proximate to the hook holes 36 at the end portions thereof respectively. The side plates 34 each further comprises two spaced pairs of bent pieces 44 bent perpendicularly outwardly adjacent the inner edges of each opening 40. A slot 46 is defined in each bent piece 44.

The retaining members 50 are attached to the inner surface of the side plates 34 of the bracket 30 respectively. A plurality of catches 52 is formed outwardly on the retaining members 50, engaging in the hook holes 36 of the bracket 30 respectively. A pair of bosses 54 is formed on each retaining member 50, corresponding to the apertures 38 of the bracket 30. Each retaining member 50 further defines a retaining portion 56 adjacent the catches 52, corresponding to the openings 40 of the bracket 30. The retaining portion 56 comprises a positioning portion 58, and a resilient arm 60 depending from a top of the retaining member 50. The positioning portion 58 is connected to the retaining member 50 via a plurality of resilient curved strips 582. The curved strips 582 can absorb vibration when the data storage device 10 is assembled. An arc-shaped lower concavity 584 is formed at a top of the positioning portion 58. The resilient arm 60 can be pressed to move outwardly. A pair of flanges 602 extends inwardly from the resilient arm 60 in proximity to an inner side of the retaining member 50. The flanges 602 and the resilient arm 60 cooperatively confine a guiding groove 604. A guiding section 606 extends slantingly inwardly from a bottom portion of the guiding groove 60. An arc-shaped upper concavity 608 is formed at a bottom of the guiding section 606. An L-shaped hook 610 is formed outwardly from the resilient arm 60 opposite to the flanges 602.

The latches 70 are pivotally attached to the outsides of the side plates 34 of the bracket 30, and comprises a pressing portion 72 and two operating ends 74 extending horizontally from two distal ends of the pressing portion 72 respectively. A pair of shafts 76 is formed at common edges of the pressing portion 72 and the operating ends 74 respectively. Ends of the shafts 76 are received in the slots 46 of the bent pieces 44 of the bracket 30 respectively to attach the latches 70 to the bracket 30. The latches 70 are movable parallel to the side plates 34 of the bracket 30, with the shafts 76 sliding in the slots 46 of bent pieces 44.

Figure 4:
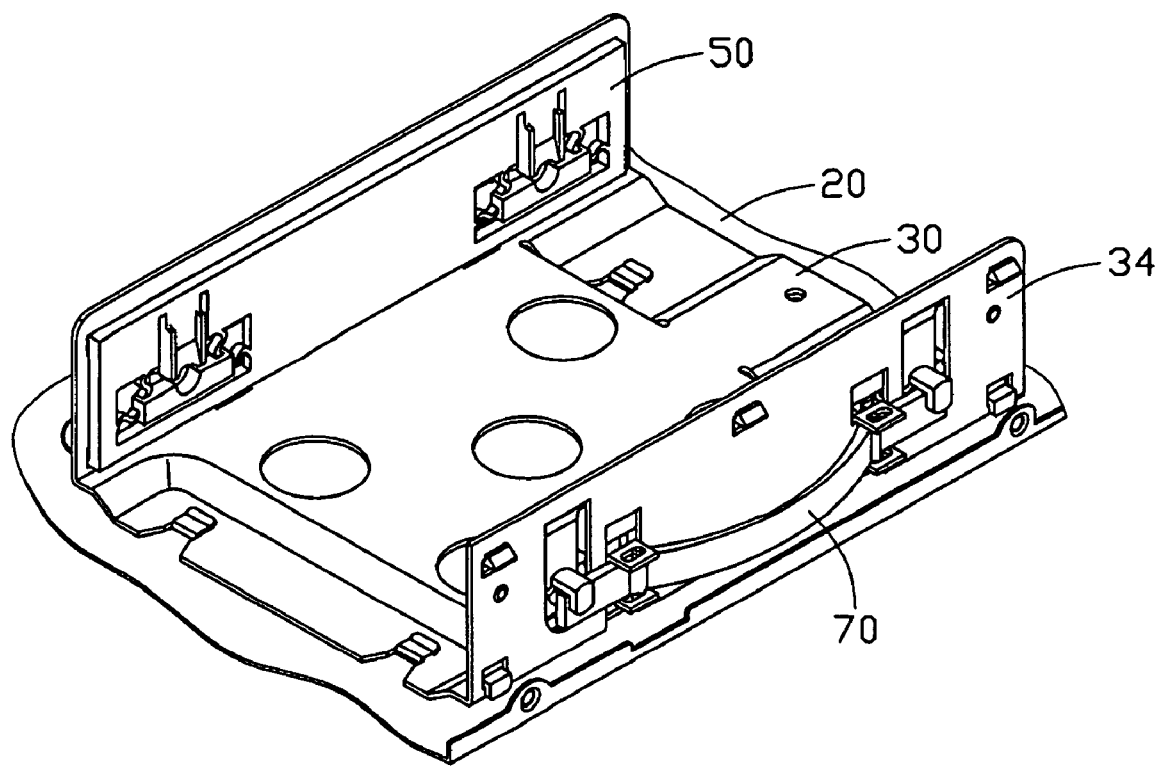
FIG. 4 is an assembled view of the mounting apparatus of FIG. 1.
Figure 5:
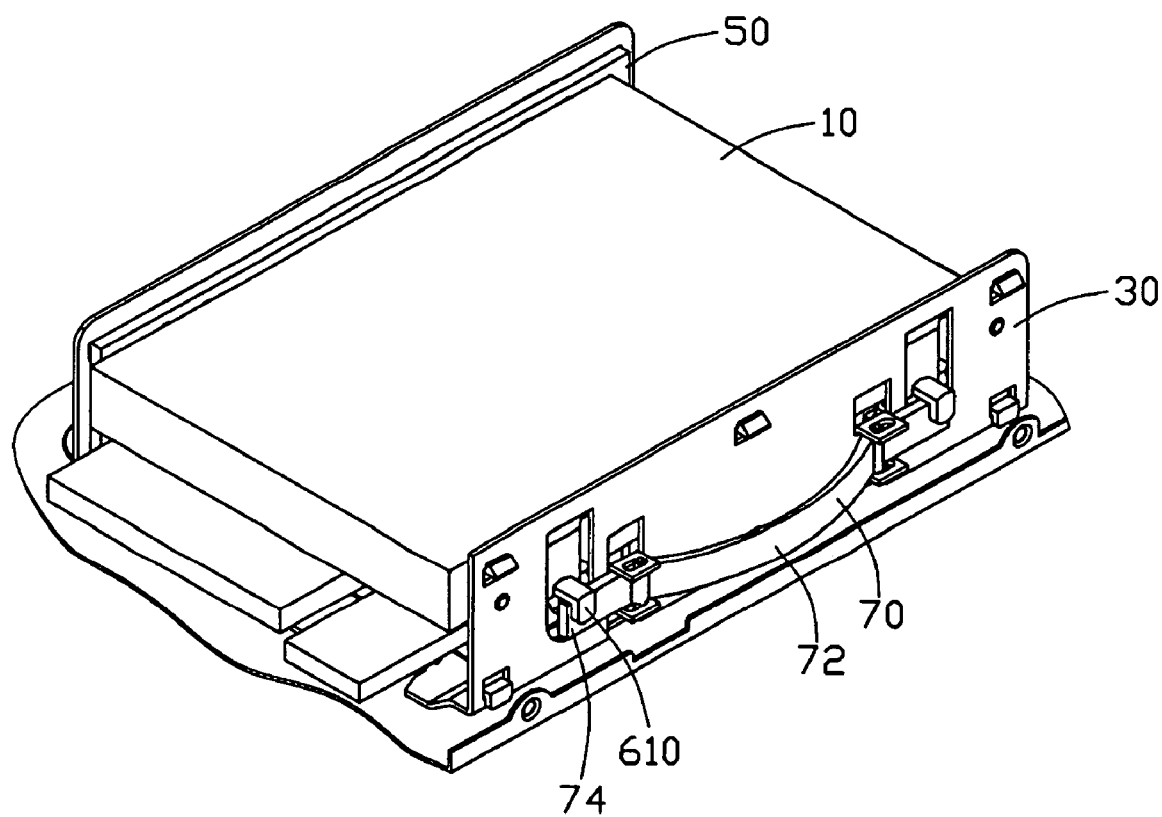
FIG. 5 is an assembled view of FIG. 1.

Referring to FIGS. 4 and 5, in assembly, the retaining member 50 and the latches 70 are firstly assembled to the bracket 30; thereafter the data storage device 10 is received in the bracket 30.

Firstly, the catches 52 of the retaining member 50 are clasped in corresponding hook holes 36 of the bracket 30. And the bosses 54 of the retaining member 50 are engaged in corresponding apertures 38. The retaining members 50 are thus attached to the inner sides of the side plates 34 of the bracket 30. The hook 610 of the retaining portion 56 of the retaining member 50 extends out from the opening 40 of the side plate 34. Secondly, each operating end 74 of the latches 70 is received in corresponding hook 610, and each shaft 76 is engaged in the slots 46 of the bent piece 44 of the bracket 30. Thus the latches 70 are attached to the outer sides of the side plates 34 of the bracket 30 respectively. Thirdly, the data storage device 10 is pressed into the bracket 30 from a top of the bracket 30. The protrusions 14 of the data storage device 10 are respectively slid along the corresponding guiding grooves 604 of the retaining member 50, the guiding sections 606 are urged toward outer sides of the side plates 34 by the data storage device 10. After the data storage device 10 passes the guiding sections 606, the guiding sections 606 rebounds, and the protrusions 14 of the data storage device 10 are secured in spaces defined by the upper concavities 608 and the lower concavities 584. The upper concavities 608 prevents the data storage device 10 from moving in a direction perpendicular to the bottom plate 32 of the bracket 30, and the lower concavities 584 prevents the data storage device 10 from moving in a direction parallel to the bottom plate 32. Therefore, the data storage device 10 is secured in the drive bracket 30.

In disassembly, the pressing portions 72 of the latches 70 are inwardly pressed to cause the operating ends 74 to be prized outwardly. The hooks 610 are driven by the operating ends 74 to move outwardly, the guiding sections 606 is then moved outwardly to permit movement of the protrusions 14 in the direction perpendicular to the bottom plate 32 of the bracket 30. The data storage device 10 is then ready to be removed from the drive bracket 30.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A mounting apparatus for a data storage device, the data storage device forming a plurality of protrusions on opposite sidewalls thereof, the mounting apparatus comprising:

a bracket comprising a bottom plate and a pair of opposite side plates extending therefrom, a pair of openings being defined in each of the side plates;

a pair of retaining members attached to inner sides of the side plates of the bracket respectively and each comprising a pair of retaining portions, the retaining portions each comprising a resilient arm and a positioning portion located thereunder, a hook formed on a bottom of the resilient arm and extending through a corresponding opening, the resilient arm abutting the protrusions for preventing the movement of the data storage device in a direction perpendicular to the bottom plate of the bracket, the positioning portion engaging with the protrusion for preventing the movement of the data storage device in a direction parallel to the bottom plate of the bracket; and a pair of latches pivotally attached to outsides of the side plates of the bracket respectively, each of the latches comprising a pressing portion and two operating ends extending horizontally from two distal ends of the pressing portion, each of the operating ends received in a corresponding hook, wherein when the pressing portion is pressed, the operating ends prize the resilient arms outwardly to allow movement of the data storage device in the direction perpendicular to the bottom plate of the bracket.

2. The mounting apparatus as described in claim 1, wherein a plurality of hook holes and a plurality of apertures are defined in each of the side plates of the bracket.

3. The mounting apparatus as described in claim 2, wherein a plurality of catches and a plurality of bosses are formed on the retaining members engaging in the hook holes and the apertures of the bracket, respectively.

4. The mounting apparatus as described in claim 1, wherein a pair of flanges extends inwardly from said resilient arm in a vertical orientation, the flanges and the resilient arm cooperatively define a guiding groove therebetween, a corresponding protrusion of the data storage device slides into the bracket along the guiding groove.

5. The mounting apparatus as described in claim 1, wherein a lower concavity is formed at a top of the positioning portion, an upper concavity is formed at a bottom of the resilient arm, a corresponding protrusion of the data storage device engages in a space defined by the lower concavity and the upper concavity.

6. The mounting apparatus assembly as described in claim 1, wherein a plurality of curved strips connects the positioning portion to the corresponding retaining member for vibration absorption.

7. The mounting apparatus as described in claim 1, wherein the side plates each comprise two spaced pairs of bent pieces bent vertically outwardly adjacent and between the openings, a slot is defined in each of the bent pieces.

8. The mounting apparatus as described in claim 7, wherein each of the latches comprises a pair of shafts, the shafts are slidably received in corresponding slots of the bracket.

9. The mounting apparatus as described in claim 8, wherein the pressing portion of each of the latches is convex and between the shafts, and wherein when the pressing portion is pressed inwardly, the operating ends are tilted outwardly and drive the hooks of each of the retaining members outwardly.

10. The mounting apparatus as described in claim 1, wherein the hook of each of the retaining members is generally L-shaped.

11. A mounting apparatus for a data storage device, the data storage device forming a plurality of protrusions on opposite sidewalls thereof, the mounting apparatus comprising:

a bracket comprising a bottom plate and a pair of opposite side plates extending therefrom which cooperatively define a space for receiving the data storage device, a pair of openings defined in each of the side plates;

a pair of retaining members attached to inner surfaces of the side plates of the bracket respectively, and each comprising a pair of resilient portions corresponding to the openings, a guiding groove formed in an inner face of each of the resilient portions, and a guiding section extending slantingly inwardly from a bottom portion of the guiding groove, a stop end defined at a bottom of the guiding section, a hook formed on an outer face of each of the resilient portions; and a pair of latches attached to outer surfaces of the side plates of the bracket respectively, each end of the latches received in a corresponding hook;

wherein each of the protrusions of the data storage device slides along a corresponding guiding groove to pass through the guiding section and limited by the stop end thereby locking the data storage device in the bracket; the data storage device is unlocked from the stop ends of the resilient portions by pressing the latches to drive the guiding section toward the side plates of the bracket.

12. The mounting apparatus assembly as described in claim 11, wherein a plurality of hook holes is defined in each of the side plates of the bracket, a plurality of catches is formed at each of the retaining members to engage in the hook holes.

13. The mounting apparatus assembly as described in claim 11, wherein each of the latches further comprises an arc-shaped convex pressing portion and a pair of shafts arranged at opposite sides of the pressing portion.

14. The mounting apparatus assembly as described in claim 12, wherein the side plates each further comprise two spaced pairs of bent pieces bent vertically outwardly between the openings, a slot is defined in each of the bent pieces, each of the shafts is slidably received in the slots of a corresponding pair of bent pieces.

15. The mounting apparatus assembly as described in claim 11, wherein a pair of positioning portions is formed at each of the retaining members, and beneath the corresponding resilient arms respectively for positioning the protrusions of the data storage device.

16. The mounting apparatus assembly as described in claim 15, wherein an arc-shaped lower concavity is formed at a top of each of the positioning portions, and an arc-shaped upper concavity is formed at said stop end of each of the resilient portions, the lower and upper concavities define a space to receive a corresponding protrusion of the data storage device.

17. The mounting apparatus assembly as described in claim 15, wherein a pair of flanges extends inwardly from a same side of the resilient arm in a vertical orientation, the guiding groove is confined by the flanges and the resilient arm.

18. The mounting apparatus assembly as described in claim 15, wherein a plurality of curved strips connects the positioning portions to the retaining members for vibration absorption.

19. A mounting apparatus assembly comprising:

a data storage device forming at least one protrusion on at least one of opposite sidewalls thereof;

a bracket comprising a bottom plate and a pair of opposite side plates extending therefrom so as to allow the data storage device to be inserted into the bracket in a horizontal insertion direction along the side plates;

at least one retaining member attached to one of the side plates of the bracket, and comprising at least one retaining portion, the retaining portion comprising a resilient arm abutting against the protrusion for preventing the movement of the data storage device in a withdrawal direction opposite to the insertion direction; and at least one latch moveably attached to said one of the side plates of the bracket, the latch comprising a pressing portion and at least one operating end extending horizontally from the pressing portion, the operating end engaged with a portion of the resilient arm; wherein when the pressing portion is inwardly pressed, the operating end actuates the resilient arm to move outwardly to unlock the corresponding protrusion so as to allow the data storage device to move in the withdrawal direction.

20. The mounting apparatus assembly as claimed in claim 19, wherein said latch performs a rotation movement generally.

\* \* \* \* \*